(12) United States Patent
Schaenzer et al.

(10) Patent No.: US 6,940,669 B2
(45) Date of Patent: Sep. 6, 2005

(54) WIDE WRITE HEAD WITH THERMAL ASPERITY DETECTOR AND METHOD OF USING THE SAME

(75) Inventors: Mark James Schaenzer, Eagan, MN (US); Scott Michael Franzen, Champlin, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 438 days.

(21) Appl. No.: 09/885,383

(22) Filed: Jun. 20, 2001

(65) Prior Publication Data

US 2002/0044369 A1 Apr. 18, 2002

Related U.S. Application Data

(60) Provisional application No. 60/212,937, filed on Jun. 20, 2000.

(51) Int. Cl.[7] ............................. G11B 5/02; G11B 27/36
(52) U.S. Cl. ............................................ 360/25; 360/31
(58) Field of Search .......................... 360/66, 113, 124, 360/75, 51, 46, 42, 25, 31; 369/70; 714/48, 25

(56) References Cited

U.S. PATENT DOCUMENTS

| | | | | |
|---|---|---|---|---|
| 4,459,248 A | * | 7/1984 | Sagawa et al. | ............. 264/427 |
| 5,115,358 A | * | 5/1992 | Widney | ........................ 360/75 |
| 5,122,917 A | * | 6/1992 | Spainger | ..................... 360/126 |
| 5,233,482 A | * | 8/1993 | Galbraith et al. | ............. 360/46 |
| 5,333,140 A | * | 7/1994 | Moraru et al. | ............... 714/719 |
| 5,423,111 A | * | 6/1995 | Mori | .......................... 29/90.01 |
| 5,527,110 A | * | 6/1996 | Abraham et al. | ............... 374/5 |
| 5,790,332 A | * | 8/1998 | Bucska | ......................... 360/51 |
| 5,901,001 A | | 5/1999 | Meyer et al. | |
| 5,909,344 A | * | 6/1999 | Gill | ............................. 360/321 |
| 6,046,837 A | * | 4/2000 | Yamamoto | ................... 359/245 |
| 6,071,007 A | | 6/2000 | Schaenzer et al. | |
| 6,104,556 A | | 8/2000 | Schaenzer | |
| 6,154,335 A | * | 11/2000 | Smith et al. | ................... 360/75 |
| 6,216,242 B1 | | 4/2001 | Schaenzer | |
| 6,292,316 B1 | * | 9/2001 | Dietzel et al. | ................. 360/31 |
| 6,335,840 B1 | * | 1/2002 | Malone | ....................... 360/25 |
| 6,421,193 B1 | * | 7/2002 | Li | ................................ 360/25 |
| 6,519,715 B1 | * | 2/2003 | Takashi et al. | ............... 714/32 |
| 6,578,164 B1 | * | 6/2003 | Stokes et al. | ................ 714/719 |
| 6,628,465 B2 | * | 9/2003 | Yong | ............................ 360/31 |

FOREIGN PATENT DOCUMENTS

GB   WO 01/22410   *   3/2001   ............ G11B/5/596

* cited by examiner

Primary Examiner—David Hudspeth
Assistant Examiner—Glenda P. Rodriguez
(74) Attorney, Agent, or Firm—Paul T. Dietz

(57) ABSTRACT

A system for detecting thermal asperities and magnetic defects on a disc. The system includes a wide write head and a certification head. The wide write head includes a thermal asperity detector and a write element. A method for detecting thermal asperities and magnetic defects comprising writing a track with the wide write head, reading defects with the certification head, and scanning for thermal asperities with the thermal asperity detector. A burst pattern can be written to the disc upon locating a asperity of defect.

21 Claims, 4 Drawing Sheets

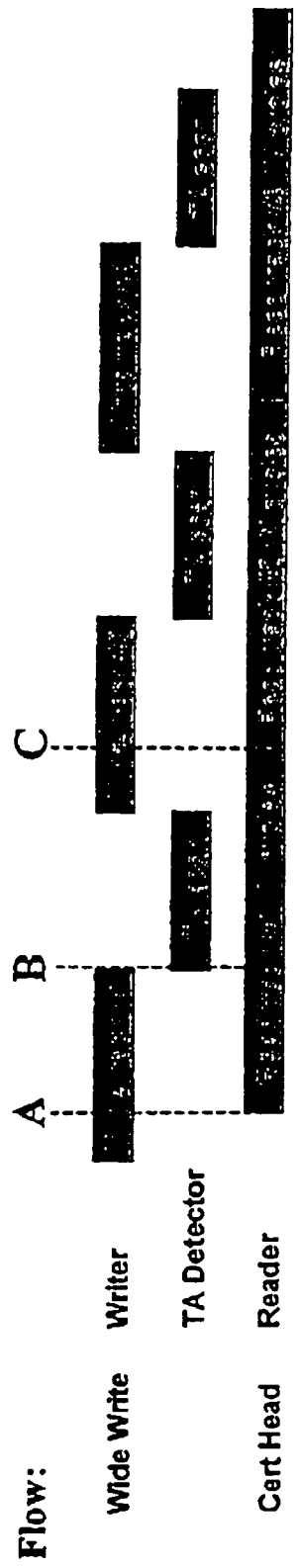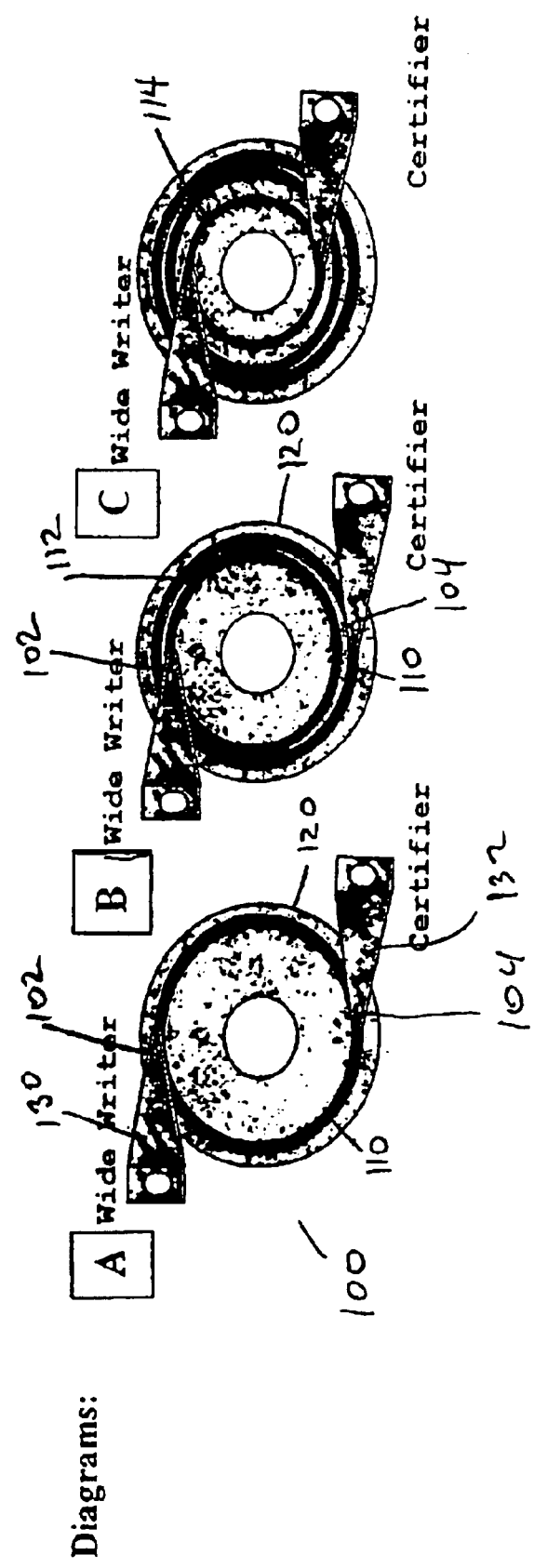
FIG. 3

WIDE WRITE HEAD WITH THERMAL ASPERITY DETECTOR AND METHOD OF USING THE SAME

CROSS-REFERENCE TO RELATED APPLICATION

This application claims the benefit of U.S. Provisional Application Ser. No. 60/212,937 entitled WIDE WRITE HEAD WITH THERMAL ASPERITY DETECTOR, filed Jun. 20, 2000.

FIELD OF THE INVENTION

The present invention relates generally to a recording media testing process, apparatus and article of manufacture and, in preferred embodiments, to such a process, apparatus and article for testing magnetic recording discs, using a combined wide write head and thermal asperity detector and, preferably, for use with a step and repeat testing procedure.

BACKGROUND OF THE INVENTION

In the pursuit of improving the performance of disc drives, there is a press to increase the capacity and reduce the cost of the drives. To increase the capacity, the emphasis has been placed on raising the number of tracks per inch on a recording media available for data storage, thus making the tracks narrower. Examples of recording media are CDs, floppy discs and other magnetic media.

One way of reading the narrower tracks is by reducing the width of the magnetic transducer or read head. When the width of the magnetic transducer is reduced, the distance between the read head and track becomes more critical because the distance affects the signal level produced in the magnetic transducer. The signal level decreases as the distance increases. Therefore, to maintain a satisfactory signal level out from the narrower read head or transducer, the spacing between the disc and the transducer is being reduced, and at the same time, the sensitivity of the magnetic transducer is being increased.

To support the advanced transducers, many advances have been made relating to recording media. For example, the magnetic layer has been improved, the carbon protective coating has been reduced, and the disc surface has become smoother. After discs are fabricated, it is important to verify the quality and integrity of the disc.

In a verification procedure, there are several steps involved with verifying the quality and integrity of the disc. One example of a verification procedure includes three steps: a disc burnishing step, a glide test, and disc certification.

Disc burnishing is a process whereby either a tape or head is used to remove minor mechanical defects and contamination from the surface of the disc. Glide testing uses a low flying head (less than 0.5 millionths of an inch) having either a vibration sensor (PZT or piezoelectric transducer, or acoustic emission sensor) or a thermal sensor (or thermal asperity sensor) to measure a frictional temperature rise. Disc certification is accomplished by writing a track on the disc, often with a separate, dedicated write head, and reading back the written signal. Signal dropouts or degradations indicate the presence of defects in the magnetic layer. An example of certification testing is found in U.S. Pat. No. 6,104,556.

Each of the tests for verifying the quality and integrity of the disc is reaching its limit as the density of the tracks increases. For example, because the tracks are narrower, the size of a defect that is critical to operation of the disc is correspondingly reduced.

In order to ensure that critical magnetic defects are detected, the width of the read element on the certification head must be maintained in proportion to the size of critical defects. If the read element is too wide with respect to the defect, the read head may not read the defect. The size of a critical defect determines the maximum size of the read element on the certification head. As the critical defect size becomes smaller, a smaller and more sensitive certification read head is required to detect defects around the critical defect size on a read track.

The relationship between the critical defect size and the read track width is generally modeled by the following equation:

Critical defect size=Read Track Width*(1−Threshold Level).

For discs used today, typical values are: the critical defect size is approximately 0.2 microns, the read track width is approximately 0.5 microns and the threshold is approximately 0.65 to 0.70. It will be apparent to one of skill in the art that the decrease in track width leads, in turn, to a decrease in the size of an allowable disc media defect. This in turn leads to decreased read element size able to detect a critical defect.

To store more data on next generation discs, the track widths will continue to shrink and will approach 0.25 microns or less, which results in twice as many tracks on the disc compared to the current number of tracks present. This change will equate to either a doubling of test time or a halving of test coverage in order to test each disc for defects.

U.S. Pat. No. 6,216,242 ("'242 patent") discloses a combination certification and thermal asperity test head used to test discs for magnetic defects and thermal asperities. The '242 patent uses a read/write head to simultaneously scan for thermal asperities and magnetic defects. However, this approach is of a limited utility as tracks sizes approach 0.25 microns and smaller.

In detecting defects, various methods can be used to test the disc surface. The quality of the recording disc surface may be tested, for example, by writing and then reading test or data tracks over the entire recording surface. However, for purposes of minimizing testing time and maximizing the output of a given tester, procedures are typically implemented for testing only a portion of the disc recording surface. Based on the tested portion, inferences are made regarding the quality of the remaining portion of the recording surface. Thus, when only a fraction of the disc is tested, the total number of defects identified during the test is factored by the area tested versus the total area of the disc.

Two types of such test procedures are referred to as "spiral testing" and "skip track testing." According to spiral testing procedures, separate read and write heads are mounted on separate linear actuators. Referring to FIG. 1, the write head 500 is controlled to continuously write a first track 530 on the disc 505 and the read head 510 is controlled to read back the signal to locate magnetic defects. Both the read head 510 and the write head 500 are continuously moved from the outside of the disc 505 to the center of the disc 505, as the disc 505 is rotatably driven on a spindle (not shown), to define a spiral path of motion relative to the disc 505. The ratio of the spindle rotation speed and the linear actuator speed determines the pitch of the spiral. In this manner, the tested portion of the disc 505 comprises a spiral test track 530, 540 extending between the outer peripheral edge of the disc 505 and the center of the disc 505.

With skip track testing, a single magnetoresistive (MR) head having both read and write transducers may be used. According to typical skip track testing procedures, the head is controlled such that, during one disc revolution, the write element writes a signal on one track of the disc. On the next revolution the read element reads back the signal recorded during the previous revolution. After the signal is read, the head is stepped to the next track location of interest, typically skipping one to two track widths for purposes of minimizing testing time and maximizing tester output.

Improvements are desired to overcome the limitations of the current equipment and methods used to verify the quality and integrity of a disc.

SUMMARY OF THE INVENTION

Generally, the present invention relates to an apparatus for detecting magnetic and thermal defects on a recording media surface. In one example embodiment, the apparatus includes a wide write head including a write element and a thermal asperity detector. The write element is used to write data to the recording media surface. The thermal asperity detector is used to detect thermal asperities on the recording media surface. The apparatus further includes a certification head for reading data written to the recording media surface by the wide write head.

The present invention also relates to a method for testing a recording media surface for thermal asperities and magnetic defects. In one example embodiment, the method includes the steps of writing a data stream to a track on the recording media with the write element of the wide write head, detecting magnetic defects in the track with the certification head, and detecting thermal asperities in the track with the thermal asperity detector on the wide write head.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 is a diagram of a method of the prior art for detecting magnetic defects using a spiral testing method.

FIG. 3 is a diagram of an example embodiment of a system and method of the present invention for detecting thermal asperities and magnetic defects in a recording media.

Figure 2:
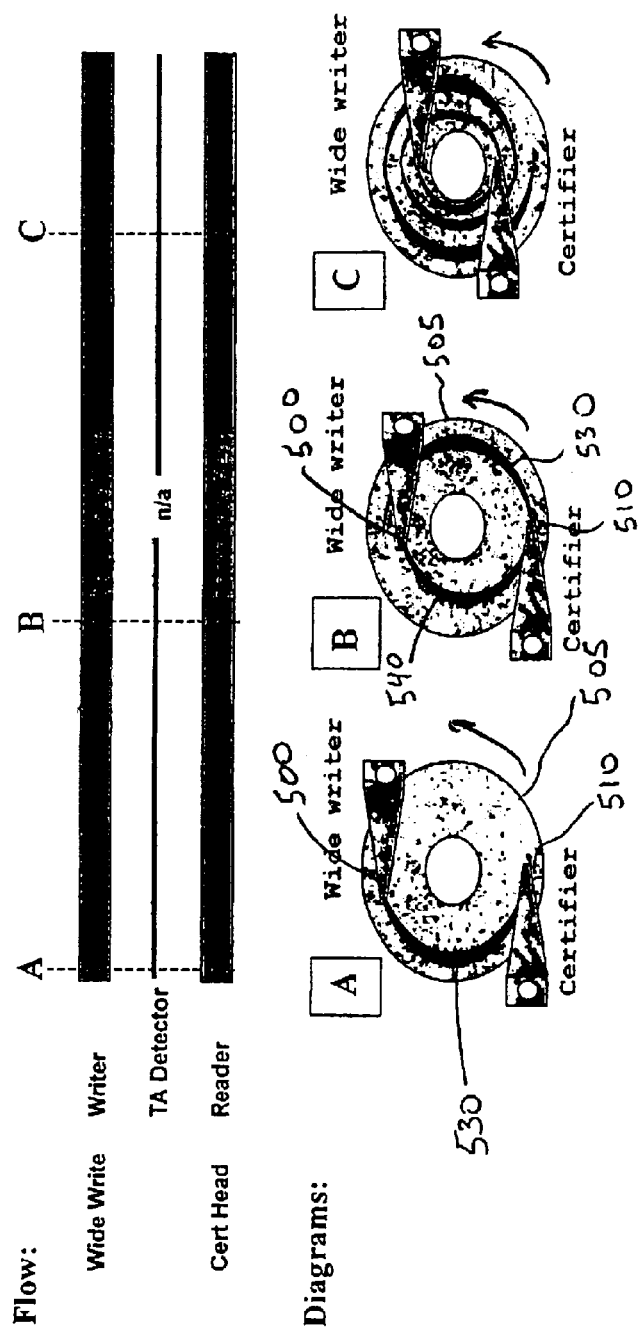
FIG. 2 is a top plan view of a disc drive which incorporates discs which can be tested using the test head and method of the present invention.
Figure 2:
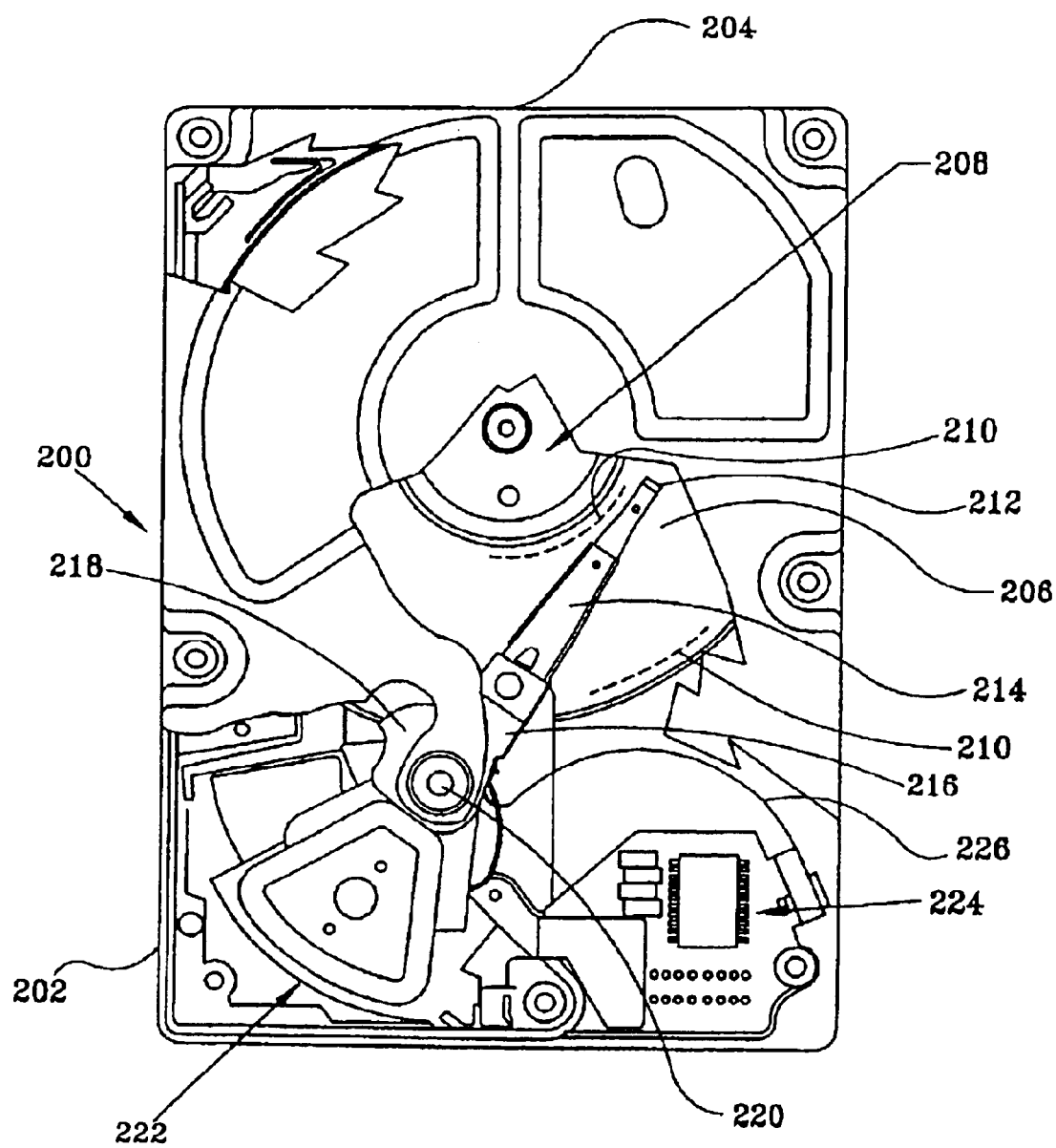

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE DRAWINGS

The present invention is generally applicable to testing discs for magnetic defects and thermal asperities. In particular, the present invention is directed to an apparatus, a method of use and an article of manufacture for a write head including a thermal asperity detector and write element. While the present invention is not so limited, an appreciation of various aspects of the invention will be gained through a discussion of the examples provided below.

Turning now to the drawings, and specifically to FIG. 2, shown is a plan view of a disc drive 200 which incorporates discs 206 of the type which can be certified and tested for the presence of thermal asperities and magnetic defects using the method and apparatus of the present invention. The disc drive 200 includes a base member 202 to which all other components are directly or indirectly mounted and a top cover 204 (shown in partial cutaway) which, together with the base member 202, forms a disc drive housing which encloses delicate internal components and isolates these components from external contaminants.

The disc drive includes one or more discs 206 which are mounted for rotation on a spindle motor shown generally at 208. The discs 206 include on their surfaces a plurality of circular, concentric data tracks, the innermost and outermost of which are shown by dashed lines at 210, on which data are recorded via an array of vertically aligned head assemblies (one of which is shown at 212). The head assemblies 212 are supported by head suspensions, or flexures 214, which are attached to actuator head mounting arms 216. The actuator head mounting arms 216 are integral to an actuator bearing housing 218 which is mounted via an array of precision ball bearing assemblies (not designated) for rotation about a pivot shaft 220.

Power to drive the actuator bearing housing 218 in its rotation about the pivot shaft 220 is provided by a voice coil motor (VCM) shown generally at 222. The VCM 222 consists of a coil (not separately designated) which is supported by the actuator bearing housing 218 within the magnetic field of an array of permanent magnets (also not separately designated) which are fixedly mounted to the base member 202, all in a manner well known in the industry. Electronic circuitry (partially shown at 224, generally, and partially carried on a printed circuit board (not shown)) controls operation of the disc drive 200. Control signals drive the VCM 222, as well as data signals to and from the heads 212, and the control signals carried between the electronic circuitry 224 and the moving actuator assembly via a flexible printed circuit cable (PCC) 226.

It will be apparent to one of skill in the art that the proper operation of the disc drive 200 depends in large part on a controlled, precise relationship between the head assemblies 212 and the discs 206. Therefore, it is common in the industry to test each of the discs 206 included in the disc drive 200 before the discs 206 are assembled into a disc drive 200. Testing each of the discs 206 includes detecting thermal asperities and magnetic defects.

Figure 4:
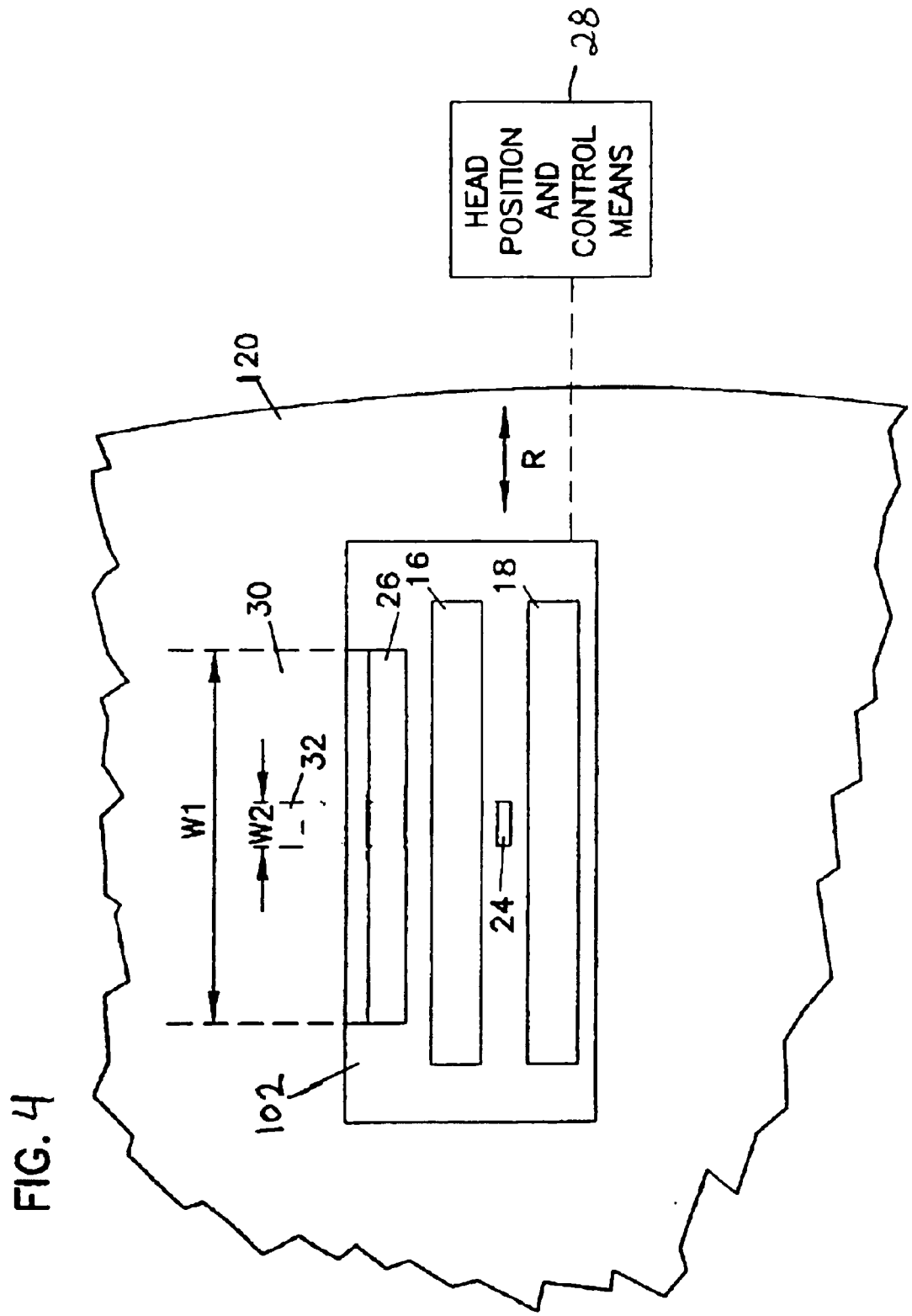
FIG. 4 is a plan view of an example embodiment of a wide write head of the present invention including a thermal asperity detector and write element.

Referring to FIGS. 3 and 4, an example embodiment of a disc testing system 100 of the current invention is shown. The disc testing system 100 includes a write or wide write head 102 and a certification head or certifier head 104. The disc testing system 100 is generally used to read and write data tracks 110, 112, 114 to a disc 120. A wide write head 102 is also used to detect thermal asperities (not shown) on the disc 120. The wide write head 102 and the certifier head 104 are coupled to support arms 130, 132, respectively. The support arms 130, 132 keep the wide write head 102 and the certifier head 104 suspended so that each respective head is kept a predetermined height from the disc 120.

Referring now to FIG. 4, shown is an example embodiment of the wide write head 102 of the disc testing system 100 of the current invention, the wide write head 102 further including a write element 26 and a thermal asperity detector 24. Typically, the write element 26 of the write head 102 has a width dimension W1 which defines a write (or test) track 30 width that encompasses plural read tracks 32. The width of the read track 32 is approximately the same size as a read element (not shown) on the certification head 104. Typically, the width W1 of the write element 26 is at least twice as wide as the read element width W2. As discussed in more detail below, by virtue of this increased write-element-width W1 to read-element-width W2 ratio, it is possible to write a data track 110, 112, 114 to be a number of times wider than the read element (not shown) of the certifier head 104. Typically, the data track 110, 112, 114 is two to eleven times as wide as the read element. Typically, a read element is about 0.5 microns in width. In another example embodiment, the thermal asperity detector 24 is decoupled from the write head 102.

In the exemplary embodiment shown, the write element 26 is on the order of ten or eleven times wider (in a radial direction R of the disk 120) than a read element (not shown). Thus, the write element 26 defines a write (or test) track 30 having a width on the order of ten or eleven times the width of the read track 32. However, as noted above, in alternate embodiments, the write element 26 may have any suitable width dimension W1 sufficient to define a data track 30 of at least two times the width W2 of the read track 32 defined by the read element (not shown) on the certifier head 104. The read track 32 is a portion of the write track 30.

The write heads 26 are fabricated with widths W1 ranging from about 20 microns up to over 100 microns. The practical limit and optimization of the data track 110 width W1 will depend on the air bearing geometry of the write head 102 and the inductance of the write element 26 as the width W1 is increased. The write head 102 is supported by suitable head support structure (not shown), and is controlled for movement in the radial direction R of the disc 120 by suitable head positioning and movement control means 28. Details of head support structures and head positioning and control mechanisms are well known in the art and are not described herein for purposes of simplifying the present disclosure.

The write head 102 including the thermal asperity detector 24 and the write element 26 can be fabricated by a variety of techniques. The write head 102 can be fabricated with the write element 26 using traditional photolithographic techniques and then the thermal asperity detector 24 can be added. One of skill in the art will appreciate that the thermal asperity detector 24 on the wide write head 102 can be fabricated using a variety of methods and materials, depending on the particular circumstances of testing conditions under which the thermal asperity detector 24 will be used. The thermal asperity detector 24 of the write head 102 can be fabricated using commonly used types of write elements (Magnetoresistive or Giant Magnetoresistive). This allows for increased width of the thermal asperity detector 24, which in turn results in coverage of a larger portion of the disc 120 for thermal asperities. Typically, the thermal asperity detector 24 is from 10 microns to 100 microns wide. Preferably, the thermal asperity detector 24 is 50 microns to 70 microns wide, and more preferably, about 60 microns wide. An advantage of locating the thermal asperity detector 24 on the write head 102 is that thermal asperity defects can be detected with the present invention using a super pulse algorithm similar to those that are commonly used today.

In one example embodiment, the thermal asperity detector 24 is fabricated in conjunction with the wide write head 102. The thermal asperity detector 24 can be made from either magnetic or non-magnetic materials. It is desirable to use a material with a low resistivity and a large change in resistance per change in temperature for the thermal asperity detector 24. In one preferred embodiment, nickel is used for the thermal asperity detector 24. Other example materials are beryllium or an iron-nickel compound. An advantage of being able to use non-magnetic materials for the thermal asperity detector 24 is that it will not be affected by the data tracks 110, 112, 114 written on the disc 120 because such non-magnetic materials are insensitive to magnetic effects. Another advantage of the present invention is that the flexibility in selecting materials from which the thermal asperity detector can be fabricated allows for choosing more durable materials.

The disc testing system 100 is used to detect magnetic defects and thermal asperities on the disc 120. The write head 102 is used to write one or more data tracks 110, 112, 114 to the disc 120. The width of each data track 110, 112, 114 is approximately the same as the width W1 of the write element 26. Data tracks 110, 112, 114 written to the disc 120 are capable of being read by the certification head 104. The certification head 104 is used to detect magnetic defects (not shown) above the critical defect size on the disc 120 by reading a portion of the data tracks 110, 112, 114. The portion of each data track 100, 112, 114 read by the certification head 104 is approximately the same width as width W2 of the read element of the certification head 104. Typically, the portion of the data track 110, 112, 114 read is one-half to one-tenth of the width of the data track 110, 112, 114. However, the portion of the data track 110, 112, 114 read can be selected to suit the particular ratio of the size of the write element 26 compared to the certifier head 104.

The disc testing system 100 of the present invention allows the same apparatus to detect both thermal asperities and magnetic defects. One advantage of this arrangement is that the need for separate glide and certification tests is eliminated because both tests can be conducted concurrently on the same disc 120. Another advantage of the current invention is that the testing time required to scan the disc 120 for magnetic defects and thermal asperities is reduced, because, as previously noted, there is no need for separate glide and certification tests and also there is a reduced need to handle the discs 120 in between process steps.

The advantages discussed are demonstrated by an example embodiment of a method of testing for magnetic defects and thermal asperities using the disc testing system 100 of the current invention, one example of which is illustrated in FIG. 3. One example embodiment of the method is accomplished by first writing a data track 110, reading the data track 110, and concurrently detecting thermal asperities (not shown) on the track 110 while reading the data track 110.

The write element 26 of the wide write head 102 writes a data track 110 to the disc 120. In one embodiment, the data track 110 width ranges from 20 microns to 100 microns, and preferably is approximately 75 microns. After the data track 110 is written, the certification head 104 begins to read a portion of the data track 110 to detect magnetic defects. Typically, when the certifier head 104 is scanning the disc 120 for magnetic defects, the write head 102 does not have to write any further data tracks 110, 112, 114, so the write head 102 is idle or unused when the certifier head 104 is reading the data track 110.

The amount of time that the write element is idle or unused is related to the ratio of the width of the write element 26 on the write head 102 to the read element (not shown) of the certifier head 104. In the example embodiment shown, the width of the portion of the data track 110 read is typically one-half to one-tenth the width of the entire data track 110. Because the portion of the data track 110 read is smaller than the entire data track 110, the disc 120 has to complete multiple revolutions for the entire data track 110 to be entirely scanned or read by the certifier head 104. Typically, the number of revolutions the disc 120 needs to revolve for the certifier head 104 to read the entire data track 110 is given by the equation:

Number of Read Revolutions=(Data Track Width/Certifier Head Width)+2

The two additional revolutions are to compensate for reading an edge portion of the data track 110. Thus, if the certifier head is one-half the width of the write head 102, then the write head 102 writes the data track 110 during one revolution of the disc 120 and the certifier head 104 reads the data track, scanning for magnetic defects, for four revolutions. When the certifier head is one-tenth the width of the write head 102, then the write head 102 writes the data track 110 during one revolution of the disc 120 and the certifier head 104 reads the data track, scanning for magnetic defects, for ten revolutions. As one of skill in the art will appreciate, the larger the write head 102 compared to the certifier head 104, the longer the amount of time that the read element 26 of the write head 102 is idle or unused. The present invention takes advantage of this idle time by using it to scan the data track 110 for thermal asperities with the thermal asperity detector 24.

Referring to FIGS. 3 and 4, in the example embodiment of an example method of detecting thermal asperities and magnetic defects of the present invention shown, while the certification head 104 is scanning the data track 110 for magnetic defects, the thermal asperity element on the wide write head 102 is used to scan the disc for thermal asperity defects (not shown).

This process can then be repeated for subsequent data tracks 112, 114. While the certification head 104 is scanning a data track 110, the thermal asperity detector 24 on the write head 102 is used to detect thermal asperities on the data track 110. After scanning the data track 110 for thermal asperities, the write element 26 writes another track 112, and the process is repeated until the portion of the disc 120 for which verification is desired is scanned for both magnetic defects and thermal asperities. The entire disc 120 can be scanned for thermal asperities and magnetic defects using the example embodiment of the method of the present invention discussed. Alternatively, a selected, representative portion of the disc 120 can be scanned for thermal asperities and magnetic defects and the results can be used to statistically characterize the unscanned portion of the disc 120.

In an example embodiment of the method of the present invention, upon detection of a thermal asperity by the thermal asperity detector 24 of the wide write head 102, the write element 26 writes a burst pattern to the area of the disc 120 containing the defect. This allows the defect to be easily located in later processing steps.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A method of detecting a media defect comprising the steps of:
    writing a first data track to the media with a write head including a write element and a thermal asperity detector;
    detecting magnetic defects on the first data track with a certification head while the media is moving; and
    scanning the first data track for thermal asperities with the thermal asperity detector.

2. The method of claim 1, further including the steps of:
    writing a second data track to the media;
    detecting magnetic defects on the second data track; and
    scanning the second data track for thermal asperities.

3. The method of claim 1, further including the step of:
    upon locating a thermal asperity during the step of scanning, writing a burst pattern to the media in a location where a thermal asperity is detected wherein the burst pattern is detectable in further analysis of the media.

4. A method of detecting magnetic and thermal asperities on a media comprising the steps of:
    writing a first data stream to a first wide track on the media with a write element located on a write head;
    reading the first data stream on a first portion of the first wide track for magnetic defects with a read element located on a certifier head; and
    scanning the first wide track for thermal asperities with a thermal asperity detector located on the write head.

5. The method of claim 4, further including the steps of:
    writing a second data stream to a second wide track on the media with the write element;
    reading the second data stream on a second portion of the second wide track for magnetic defects with the certifier head; and
    scanning the second wide track for thermal asperities with the thermal asperity detector.

6. The method of claim 4, further including the step of:
    upon locating a thermal asperity during the step of scanning, writing a burst pattern to the media in a location where a thermal asperity is detected wherein the burst pattern is detectable in further analysis of the media.

7. The method of claim 4, further including the step of:
    stopping writing of the first data stream on the first wide track while reading the first data stream on a portion of first wide write track.

8. A testing system comprising:
    a disc drive having a spindle on which a disc can be mounted and motor for rotating the disc;
    a write head including a write element for writing a first data track to a disc, and a thermal asperity detector; and
    a certification head for detecting magnetic defects on the first data track;
    wherein the thermal asperity detector simultaneously scans the first data track for thermal asperities while the certification head detects for magnetic defects.

9. The testing system of claim 8, wherein the thermal asperity detector is fabricated from magnetic material.

10. The testing system of claim 8, wherein the thermal asperity detector is fabricated from nickel.

11. The testing system of claim 8, wherein the thermal asperity detector is fabricated from a material picked from a group consisting of nickel, beryllium and nickel-iron.

12. The testing system of claim 8, wherein the thermal asperity detector has a width ranging from 10 microns to 100 microns.

13. A testing system for detecting thermal asperities and magnetic defects on a media comprising:
   a write head including a write element, the write head located on a first support arm wherein the write element is activated to write a track onto the media during a first period;
   a thermal asperity detector, included in the write head, wherein the asperity detector is activated to detect asperities during a second period; and
   a read head located on a second support arm wherein the read head is positioned to certify the track written by the write element during the second period.

14. A testing system for detecting thermal asperities and magnetic defects on a media comprising:
   a write head including a write element and a thermal asperity detector, the write head located on a first support arm wherein the write element is activated to write a track onto the media during a first period and the asperity detector is activated to detect asperities during a second period; and
   a read head located on a second support arm wherein the read head is positioned to certify the track written by the write element during the second period.

15. The testing system of claim 14 wherein the thermal asperity detector is fabricated from a non-magnetic material.

16. The testing system of claim 14 wherein the thermal asperity detector is fabricated from a material picked from a group consisting of nickel, beryllium and nickel-iron.

17. The testing system of claim 14 wherein the thermal asperity detector has a width ranging from about 10 microns to 100 microns.

18. The testing system of claim 14, wherein the thermal asperity detector is fabricated from nickel.

19. The testing system of claim 14, wherein the width of the write head is from about 20 microns to 100 microns.

20. The testing system of claim 17, wherein the width of the write head is about 75 microns.

21. The testing system of claim 14, wherein the write element has a first width and the read element has a second width and a ratio of the first width to the second width is from 2 to 11.

* * * * *